Feb. 6, 1962 V. L. CARISSIMI 3,020,380
CONTROL DEVICE

Filed Dec. 14, 1956 2 Sheets-Sheet 1

WITNESSES:
Bernard R. Gieguey
E. a. Beutel

INVENTOR
Vincent L. Carissimi
BY
Arthur T. Stratton
ATTORNEY

Feb. 6, 1962 V. L. CARISSIMI 3,020,380
CONTROL DEVICE
Filed Dec. 14, 1956 2 Sheets-Sheet 2

# United States Patent Office 3,020,380
Patented Feb. 6, 1962

3,020,380
CONTROL DEVICE
Vincent L. Carissimi, Fairfield, Conn., assignor to Westinghouse Electric Corporation, East Pittsburgh, Pa., a corporation of Pennsylvania
Filed Dec. 14, 1956, Ser. No. 628,383
22 Claims. (Cl. 219—20)

My invention relates to a device for controlling an electrical circuit, and more particularly to a device for controlling the electrical energization of an electrical heating unit such as the heating unit of an electric range.

In the art of cooking, the particular temperature at which a food or mixture should be cooked varies due to the variations of the content of the various foods and mixtures. For a particular food or mixture, however, there is a particular optimum temperature range at which the cooking process should be performed. Obviously, therefore, the heat output of a heating unit, such as an electrical heating unit, must be variable in order to obtain the various particularly desired cooking temperatures. In addition, it is desirable that the desired temperature be achieved as rapidly as possible, and thereafter only sufficient heat be supplied to maintain the food or mixture at the desired temperature without the necessity of manual adjustment of the heat output of the heating unit.

Heretofore, various controls for such purposes have been developed which have not been entirely satisfactory due to their expensive components and the requisite calibration for proper operation. Other prior devices of a simplified construction have not been satisfactory as they have not given consistent operation due to various reasons, such as contact wear, high current requirements or ambient temperature effects.

Accordingly, one object of my invention is to provide a new, improved and simplified control device for accurately varying the heat output of a heating element.

Still another object of my invention is to provide a new and improved control device for accurately controlling the heat output of a heating element which is easily calibrated.

A more particular object of my invention is to provide a new and improved control device which may utilize a high resistance in the electrical control circuit.

A more specific object of my invention is to provide a new and improved control device having a variable resistance electrically connected to a control resistance whereby the current in the control resistance may be infinitely varied.

These and other objects of my invention will become more apparent upon consideration of the following detailed description of preferred embodiments thereof, when taken in conjunction with the attached drawing, in which.

Figures 1, 2, 6:
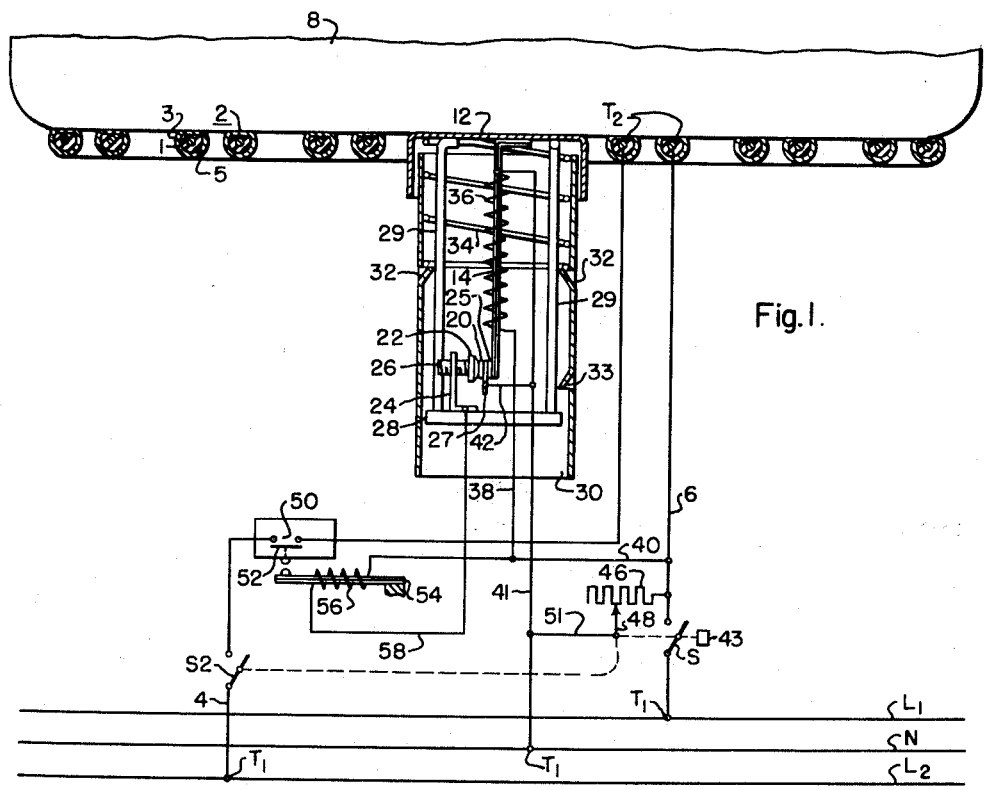
FIGURE 1 is a cross sectional view of a heating element and a control device constructed in accordance with the principles of my invention associated therewith and the electrical control circuit therefor.
FIG. 2 is a longitudinal sectional view of a control switch for use in the control circuits shown in FIGS. 1, 3, 4 and 5.
FIG. 6 is a cross sectional view of the switch as shown in FIG. 2 taken along the lines VI—VI thereof.

The use of electrical resistance heating elements, and particularly those for electrical ranges, for which my control is ideally suited, are well known in the art, and accordingly, their construction and operation need not be described in detail. In the drawing, an electrical heating element 2 is shown which may consist of a resistance wire 1 encased in a tubular metal sheath 3 with insulating material 5 spacing the resistance wire from the sheath. The heating element 2 is usually arranged in a flat spiral and has its opposite ends electrically connected by means of suitable electrical conductors 4 and 6 to suitable electrical supply conductors $L_2$ and $L_1$, respectively. As is customary, suitable terminals $T_1$ and $T_2$ may be provided for securing conductors 4 and 6 to the conductors $L_1$ and $L_2$ and the heating element 2, respectively. It is to be realized that the particular showing of the heating element 2 is merely representative of various types of standard heating elements commercially available, and that my invention may be utilized with any of such heating elements at any desired operating voltage. A three-line supply system is commonly employed, accordingly, the conductors $L_1$ and $L_2$ are shown with a third grounded neutral conductor N as an electrical supply circuit.

As also shown, heating element 2 is adapted to support a cooking vessel 8 on its upper surface, and is provided with a central opening in which a control unit constructed in accordance with the principles of my invention is located. Although not shown, the heating element 2 is adapted to be stationarily supported by suitable means such as the frame of an electric range in a well known manner. Further, it is to be realized that water is the common cooking fluid employed and that at standard atmospheric conditions the boiling temperature of water is 212° F. The boiling point of water varies with variations in atmospheric conditions so that it is necessary for a range manufacturer to supply a control unit which will function under all normally encountered atmospheric conditions.

The control unit illustrated in FIG. 1 comprises an inverted cup-shaped sensor plate 12, the upper surface of which is biased into engagement with the bottom of the vessel 8, as hereinafter described. The sensor plate 12 is preferably formed from a heat conducting, high creep strength material, such as stainless steel, which is also resistant to the corrosive effects of food spillage which may occur during the cooking process. A generally L-shaped sensor bimetal 14 is located centrally of the underside of the sensor plate 12, with the one leg thereof being secured to the undersurface thereof in any suitable manner, such as by being resistance welded or brazed thereto. The bimetal 14 is of laminated construction and may be made from any suitable pair of dissimilar materials having different coefficients of expansion, as are well known in the art and is designed, as will become more apparent hereinafter, so that upon heating the lower free end moves in a counterclockwise direction as viewed in FIG. 1.

An insulating plate 25 of any suitable high temperature insulating material is secured to the free end of the sensor bimetal 14 in any suitable manner, such as by riveting. The plate 25 may be secured to the bimetal 14 so as to extend longitudinally outwardly from the free end thereof or, as shown, to be coextensive with a free end portion of the bimetal 14. The insulating plate 25 may be of any suitable configuration to support a contact 20 thereon which is thus electrically insulated from the bimetal 14. The contact 20, which is formed from any suitable arc-resistant material such as an alloy of silver, is secured to the plate 25 in any suitable manner such as by being riveted thereto. In order to facilitate making electrical connections to the contact 20, an electrical conducting terminal 27 is provided which is electrically connected to the contact 20 and insulated from the bimetal 14 by the plate 25. The contact 20 is cooperable with a contact 22, of a material similar to that of contact 20, and which is adjustably secured to a generally L-shaped electrical conducting support 24 formed from a suitable electrical conducting material such as an alloy of copper. It will be noted that the contact 22 is provided with an outwardly threaded shank 26 which threadedly engages an opening in one leg of the support 24 so that the position of the contact 22 with respect to the one leg of the support 24, and consequently with respect to the other contact 20, may be varied. In order to permit the contact 22 to engage contact 20 with various contact pressures, the bimetal 14 is preferably formed from a resilient bimetal material, as is well known. Although this particular simplified adjustable structure may be utilized between the support 24 and the contact 22, it is to be realized that other suitable adjustable means may be employed.

The other leg of the support 24 is rigidly secured in any suitable manner, such as by riveting, to a support plate 28 located below the free end of the sensor bimetal 14, which is formed of an insulating material such as a phenolic insulating material. The support plate 28 in turn is rigidly secured to the underside of the sensor plate 12 in any suitable manner and, as shown, a plurality of elongated upwardly extending tie rods 29 are permanently secured at opposite ends to both the support plate 28 and the underside of the sensor plate 12 adjacent the fixed leg of the sensor bimetal 14, respectively. The particular manner of securing the ends of the tie rods 29 to the underside of the sensor plate 12 may be accomplished in various well known manners, such as bending the ends of the tie rods 29 transversely and soldering, welding or brazing the transversely extending parts to the underside of the sensor plate 12.

In order to prevent the aforesaid assembly from being fouled due to spillage, a circular shield 30 is provided which may be rigidly secured to the aforementioned range frame, not shown, to which the heating element 2 is secured to also be supported thereby. The shield 30 is preferably formed from a suitable corrosion resistant material, such as stainless steel or aluminum, and is located so as to receive the bimetal 14 and the support 24, with its upper end being located within the sensor plate 12, and with its lower edge being spaced below the support 24. The shield 30 is provided with inwardly extending supporting legs 32 for supporting the bottom coil of a coil compression spring 34. The spring 34 is formed of any suitable spring material which is resilient at elevated temperatures, such as stainless steel, so that it is capable of withstanding the induced thermal stresses produced by alternate heating and cooling, and is also resistant to corrosion. The upper coil of spring 34 engages the undersurface of the sensor plate 12 and extends around the tie rods 29 in order to bias the upper surface of the sensor plate 12 upwardly into engagement with the lower surface of the vessel 8. Upward movement of the sensor plate 12 is preferably limited when a vessel is not located thereon by inwardly extending legs 33 on the shield 30 for engagement by the upper surface of the support plate 28. As can be appreciated, positive engagement between the vessel 8 and the upper surface of the sensor plate 12 is desirable to insure good heat transfer from the vessel 8 to the sensor plate 12.

In order to obtain selective control of the operation of the sensor bimetal 14, a heater coil 36 of any suitable electrical resistance wire is wound about bimetal 14 and insulated therefrom, in any desired way, for example, by providing a sheath of insulating material over the bimetal element where it is engaged by heater coil 36. The heater coil 36 has one of its ends electrically connected by means of a suitable conductor 38 to another suitable electrical conductor 40 having one of its ends connected to the conductor 6. The other end of heater coil 36 may be, as shown, electrically connected to the upper end of the bimetal 14 in any suitable manner, such as by being welded or brazed thereto. This other end of the heater coil 36 is electrically connected, by a suitable electrical conductor 41, to the supply conductor N. Again a suitable terminal $T_1$ may be employed for connecting conductors 41 and N together. It will also be noted that the terminal 27 is electrically connected to the conductor 41 by means of a suitable conductor 42.

As shown, the heater coil 36 is connected between the supply conductors $L_1$ and N so as to be operative regardless of the energization of the heater coil 2. In order to vary the electrical input to the heater coil 36, a resistor 46 is connected to the conductor 6 and an adjustable tap 48 is electrically connected to the conductor 41 by means of a suitable electrical conductor 51. The tap 48 adjustably engages the resistor 46 so as to provide in conjunction with the resistor 46 a variable resistor in parallel with the heater coil 36. It is also desirable that the conductor 6 be provided with an on-off switch so that one side of the heater coil 2 may be disconnected from the line $L_1$. Accordingly, a switch S having relatively movable contacts is provided for the conductor 6 at a location between the resistor 46 and the line $L_1$. Switch S may be of any conventional type; however, in order to provide a single manual control, the switch S is mechanically connected to the movable tap 48 so that both are operable by a single handle 43, and the switch S is preferably provided with "on" and "off" positions, and is of a construction so that it can be moved beyond the "on" position to obtain adjustment of the tap 48 across the resistor 46. With such a construction and by placing a suitable marked identification plate in juxtaposition with handle 43 of the switch S, the handle 43 may be moved to a given position so as to both electrically connect the heater 36 across the lines $L_1$ and N, and to also move the adjustable tap 48 to the desired operating position with respect to the resistor 46. In some instances it is also desirable to provide for a positive break in both of the supply conductors connected to the heater 36. In such event a switch S2 having separable contacts in the conductor 4 may be provided which are movable to their open and closed position simultaneously with the opening and closing of the switch S and by the same operating mechanism.

As also shown, the conductor 4 is provided with a pair of normally open spaced relay contacts 50, of a material similar to contacts 20 and 22, which are adapted to be electrically bridged by means of a movable contact 52. The operation of the movable contact 52 may be obtained by means of a bimetal 54, which is similar in construction to the bimetal 14 previously described, and around which a heater coil 56 is disposed, similar to the heater coil 36. As shown, the one end of the heater coil 56 is electrically connected to the conductor 40 and the other end is electrically connected to the support 24 by means of a suitable electrical conductor 58. Further, the bimetal 54, as shown, is fixedly secured at one of its ends and is of a construction so that upon heating, its free end engages the movable contact 52 to force the movable contact into bridging engagement with the spaced contacts 50. Although the relay comprising the contacts 50 and 52 has been satisfactory, it is to be realized that such structure is only one of various types of relays which may be employed. As will become apparent, other control devices, such as a magnetic relay or hot wire relay, may be substituted for the above described relay.

The system as shown in FIG. 1 is in the normal "off" position with switch S open and relay contacts 50, 52 disengaged from each other. In this position it will be noted that the bimetal contact 20 engages the contact 22, with the bimetal element 14 under predetermined stress. By placing the vessel 8 upon the heating coil 2 the sensor plate 12 is depressed, but this does not have any effect upon the engagement of the contacts 20 and 22. By moving the handle 43 of the switch S to its closed circuit position, the heater coil 36 is directly connected across supply lines N and $L_1$ by means of the circuit comprising conductor 41, heater coil 36 and the conductors 38, 40 and 6. Current flow will immediately cause heating of the heater coil 36. The magnitude of such current flow will be dependent, however, upon the position of the variable resistor 48—46 connected in parallel with the heater coil 36, and in no event will sufficient heat be generated by heater coil 36 to build up sufficient deflecting force in the bimetal element 14 to separate contacts 20, 22.

At the same time the switch S is closed, it will be noted that the heater coil 56 is directly connected across supply lines $L_1$ and N by means of conductors 6 and 40 and conductor 58, support 24, engaged contacts 20—22, terminal 27, and conductors 42 and 41. By means of the current flow through the heater coil 56, the bimetal 54 will be heated to cause its free end to engage the contact 52 and move it into bridging relationship with the spaced contacts 50, whereby the heater coil 2 will be connected across the supply lines $L_1$ and $L_2$ by means of the circuit comprising conductor 4, having electrically bridged contacts 50 therein, and conductor 6, having the closed switch S therein. As soon as heating of the heating element 2 occurs, heat will be transmitted to the vessel 8 and its contents which, in turn, will cause heat to be transmitted to the sensor plate 12 and the sensor bimetal 14 secured thereto.

Such heating of the sensor bimetal 14 will tend to cause it to move counterclockwise as described, which will continue until the sensor bimetal 14 has received sufficient heat to overcome the contact pressure between the contacts 20 and 22 whereby the contact 20 will be moved away from the contact 22. Of note, however, is the fact that as the heater coil 36 has been heated during this period and as the deflection of the heated bimetal 14 is in a direction to open the contacts 20 and 22, it is not necessary for the sensor bimetal 14 to receive all of the heat from the vessel 8 alone to cause separation of the contacts 20—22, as it will be simultaneously receiving heat from heater 36. Upon separation of contacts 20 and 22 the heater coil 56 will be disconnected from the supply lines $L_1$ and N, so that bimetal 54 will no longer be heated and will start to lose its heat to the surrounding air. When bimetal 54 has cooled sufficiently, it will move away from the contact 52 and permit the movable contact 52 to move out of engagement with the spaced contacts 50, whereby the heater element 2 will be disconnected from the supply lines $L_1$ and $L_2$ and, in turn, will start to cool.

Cooling of the heating element 2 will cause the vessel 8 and its contents to cool and in turn the sensor bimetal 14 will be cooled. Upon cooling, the sensor bimetal 14 will move clockwise to reestablish engagement of the contacts 20 and 22 by moving the contact 22 toward contact 20. It will be noted, however, that the heater coil 36 is not disconnected from the supply lines $L_1$ and N as long as the switch S remains closed, so that the bimetal 14 is constantly receiving some heat from heater coil 36 regardless of whether the contacts 20 and 22 are in or out of engagement with each other. By varying the heat output of the heater coil 36 by means of the variable resistance 46—48, a range of temperatures of the vessel 8 at which the contacts 20—22 will separate may be obtained.

The effect of the heater coil 36 can also be understood by considering the circuit without any heat being supplied by the heater coil 36. In such event, when the sensor bimetal 14 receives sufficient heat from the vessel 8, it will move counterclockwise so as to separate the contacts 20 and 22 and, as indicated, heating element 2 is deenergized. Upon deenergization of heater element 2, the vessel 8 is cooled and the sensor bimetal 14 is cooled and moves the contact 20 back into engagement with contact 22. Thus, the device without the heater coil 36 will have a specific cycling temperature dependent upon the characteristics of the bimetal 14 and depending upon the contact pressure between the contacts 20 and 22. It, of course, will be obvious that by increasing the contact pressure between the contacts 20 and 22 a greater force must be exerted by the sensor bimetal 14 before cycling of the device will occur.

By supplying the heating coil 36 with heat, contact 20 is urged away from contact 22 so that the sensor bimetal 14, in this case, receives the heat it requires from two sources to deflect counterclockwise to obtain separation of the contacts 20 and 22. In view of the fact that the variable resistor 46—48 has an infinite number of positions within limits, it can be seen that the cycling temperatures may readily be varied between a wide range of values, as each setting of variable resistor 46—48 will cause a change in the current flowing through the heating coil 36 and, consequently, a change in the heating of the bimetal 14.

It will be noted that inasmuch as the relay illustrated includes the thermally responsive bimetal 14, a definite time delay is involved in its operation. This is desirable for a number of reasons. First of all, such a time delay prevents excessive operation of the contacts 50, 52 at times when the contacts 20, 22 are just at the point of engagement or disengagement and may have an inherent tendency to chatter or be vulnerable to chatter due to outside vibrational forces. In addition, the time delay of the relay insures that the heating and cooling periods of the heating element 2 will be of a predetermined minimum duration.

Figure 3:
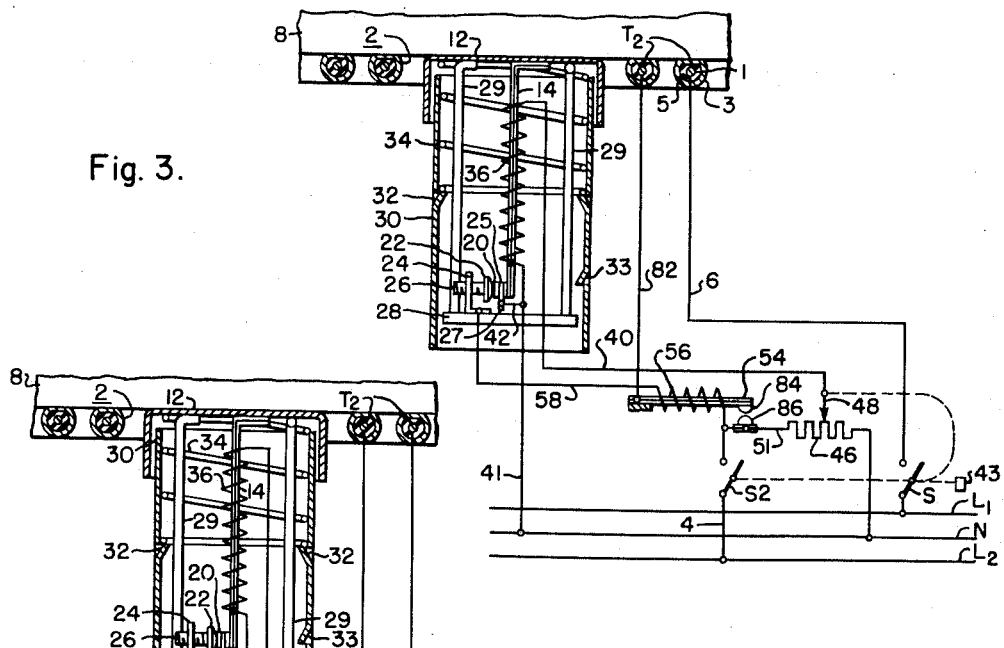
FIG. 3 is a view similar to FIG. 1 but illustrating a modification of the circuit shown in FIG. 1.
Figure 4:
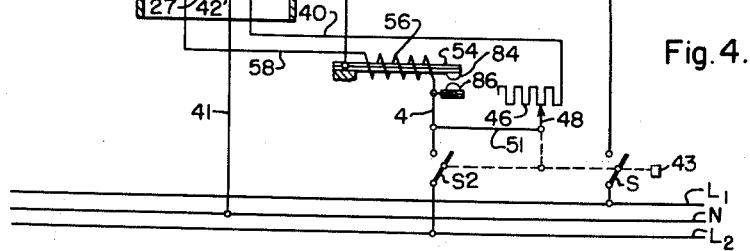
FIG. 4 is a view similar to FIGS. 1 and 3 but illustrating another modification of the control circuit.
Figure 5:
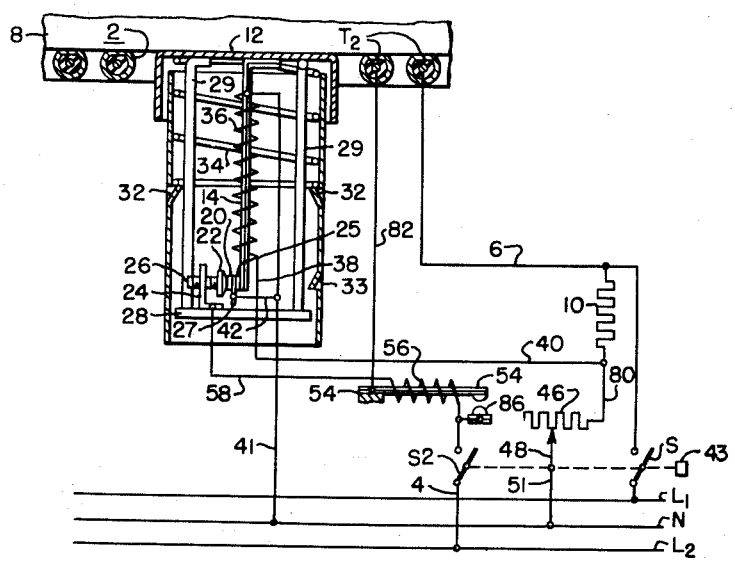
FIG. 5 is a view similar to FIGS. 1, 3 and 4 but illustrating still another modification of the control circuit.

FIGS. 3, 4 and 5 are similar to FIG. 1, and accordingly, like parts have been given the same reference numerals. It will be noted in FIG. 1 that if the tap 48 is moved to the extreme end of the resistor 46 adjacent the conductor 6 that a short circuit could result between conductors $L_1$ and N. It, of course, is obvious that by limiting the movement of the tap 48 toward the end of the resistor 46 so that a portion of the resistance 46 is in the circuit between the conductors $L_1$ and N at all times, such a short can be prevented. FIG. 5 illustrates a modified circuit utilizing a dropping resistor 10 whereby movement of the tap 48, which is connected to the conductor N, cannot cause a short. As shown, the resistor 46 is connected by means of a conductor 80 to one end of the dropping resistor 10, the other end of which is connected to the conductor 6. The conductor 40 is also connected to the conductor 80 between the dropping resistor 10 and the resistor 46 so that the dropping resistor 10 is in the heater coil 36 supply circuit at all times regardless of the position of the tap 48.

FIG. 5 also illustrates that the spaced contacts 50 may be eliminated and the bimetal 54 utilized to directly control the other side of the line to the heating element 2. In FIG. 1, the heater coil 56 is connected to the conductor 40, which connection has been eliminated in FIG. 5. The bimetal 54 is electrically connected by means of a conductor 82 to the heating element 2, and it is provided with a contact 84 at its movable end. The movable contact 84 is adapted to engage a stationary contact 86 which is electrically connected to the conductor 4. The contacts 84 and 86 are of a material similar to contacts 20 and 22 previously described. In this modification closing of the switches S and S2 simultaneously, or individually if desired, causes current to flow from conductor $L_2$, through conductor 4, the heater coil 56, conductor 58, support 24, engaged contacts 20, 22, terminal 27, and conductors 42, 41 to the conductor N. The heating of the heating coil 56 causes the contact 84 to engage the contact 86 whereby the heating element 2 is connected to conductor L₂ through conductor 4 having closed switch S2 therein, engaged contacts 84, 86, bimetal 54 and conductor 82. As shown, the conductor 82 is connected to the bimetal 54 remotely from the contact 84 so that current flow therethrough may additionally cause heating of the bimetal 54. If desired, however, the conductor 82 may be connected directly to the contact 84 to eliminate such additional heating effect. The bimetal 54 must obviously have the characteristic of moving toward the contact 86 when heated. The operation of all other aspects of this modification are believed to be obvious in view of the previous discussion relating to FIG. 1.

FIGS. 3 and 4 are identical to FIG. 5 in many respects including the contacts 84 and 86, and accordingly, the same numbers have been used to identify like parts. FIG. 4 differs from FIG. 2, in that the resistor 46 is connected in series with the heater coil 36 rather than in parallel, as previously described. Thus, it will be noted that the tap 48 is disconnected from the conductor 41 (FIG. 1) and is connected directly to the conductor 41 by a conductor 51. The resistor 46 is disconnected from conductor 6 and is directly connected at one of its ends to conductor 40. Thus, a series circuit is established from conductor L₂, through conductor 4 with closed switch S2 therein, conductor 51, the portion of the resistor 46 between the conductor 51 and the tap 48, conductor 40, the heating coil 36 to the conductor 41 which is connected to the conductor N. Obviously, as the resistance 46 is in series with the heater coil 36, the current flowing through the heater coil 36 will be dependent upon the position of the tap 48 with respect to the resistor 46. The operation of the remainder of the circuit is believed obvious in view of the foregoing discussion.

FIG. 3 is similar to FIG. 4 except that the entire resistor 46 is connected across the conductors L₂ and N and the tap 48 is connected to the conductor 40. Such a modification obviously permits the resistor 46 and the tap 48 to function as a variable resistance similar to the previously described embodiments of the invention.

FIG. 2 shows a combined variable resistance and line switch which may be used in the various modifications of my invention described above. As shown, the control unit comprises an elongated cup-shaped housing 90 which is preferably formed from a suitable insulating material, and having therein an elongated electrical resistance wire 92 coiled about a suitable insulating support 93. The support 93 is supported by suitable legs 99 secured to the base so that the support 93 is located adjacent the base of the housing 90 but spaced therefrom. One end of the wire 92 and the support 93 is spaced inwardly from one end of the housing 90 to provide space for a pair of separable line contacts 94. An elongated electrical conducting rod 95 is supported at the ends of the housing 90 in any suitable manner, as by legs 97 secured to the base, and the rod is located between the support 93 and the open side of the housing 90 to provide a support for the movable tap of the rheostat. In order to establish electrical contact at any point along the wire 92 with the rod 95, a resilient C-shaped shoe 96 of any suitable electrical conducting material, such as an alloy of copper, is provided for slidable engagement with the rod 95, and it has an integral V-shaped extension 103 for slidable engagement with the wire 92. The shoe 96 is supported by means of a sliding support 98 of insulating material, such as a molded phenolic insulating material which may readily be provided with the necessary structure as hereinafter described.

The open side of the housing 90 is provided with a cover 102 which may be secured thereto in any suitable manner, not shown. The cover 102 is provided with an elongated slot 104 opposite the rod 95. As shown, the support 98 is provided with a handle portion 106 which extends outwardly through the slot 104 of the cover 102 so that it may readily be engaged for operation. The support 98 immediately adjacent the inner side of the slot 104 is provided with outwardly extending wing portions 105 and its inner end 112 engages the base of the housing 90 to definitely locate the handle portion 106 with respect to the housing 90 and the slot 104, and to guide it for movement. The support 98 is also provided with an integral extension having a notch 100 in the outer end which receives the rod 95. The shoe 96 is located so that its C-shaped portion has its ends in the notch 100 to engage the rod 95, and has its extension 103 engaging the wire 92. The inner end 112 of the support 98 may be provided with an integral projection engageable with a slot, not shown, in the base of housing 90 to provide additional support and guidance for the support 98 during sliding movement thereof.

In order to provide means for establishing electrical connections to the wire 92 and the rod 95, it will be noted that one end of the wire 92 is connected to the leg 99 of electrical conducting material extending outwardly through the base of the housing 90 to form a terminal. The rod 95 is similarly connected to a similar terminal leg 97. Thus by connecting the terminals 99 and 97 in the circuits as previously indicated, it will be obvious that the resistance in the circuits described in FIGS. 1, 4 and 5 may be varied upon sliding movement of the shoe 96 and the support 98. Although not shown, the other end of the wire 92 may be electrically connected to a similar terminal so that the structure may function in the circuit shown in FIG. 3. Also, as shown, line contacts 94 are each mounted on and electrically connected to suitable terminals 116 and 118 which extend outwardly through the base of housing 90 so as to be connectable to the circuits, as previously indicated. The support 98 may be provided with an integral laterally extending projection 120 between the base of the housing 90 and the support 93 which extends towards the terminals 116 and 118. The terminal 118 in this case is formed of a resilient material and is of a width such that a portion thereof is in the path of movement of the projection 120, but terminal 116 is not, so that the terminal 118 will be engaged when the support 98 is in its extreme left position (FIG. 2) to separate contacts 94. Thus, linear rightward movement of the support 98 will move the projection 120 away from the terminal 118 so that the contact 94 thereon will engage the other contact 94. It is to be realized that this particular switch and rheostat are merely illustrative of various types of control devices which may be utilized in the control circuits of my invention.

From this description and the illustrations of various modifications of my invention, it will be noted that I have provided a control device which is unique in various respects. Primarily, as the manual control is a variable resistance, the control setting is not affected by ambient temperature to any substantial degree. Further, as a resistance element is used to control the current to the heater coil 36, the resistance of the heater coil 36 has much wider design parameters so that it is commercially feasible to manufacture such coils on a high volume basis. Of great importance is the fact that as the control unit includes a resistance element which is in the circuit at all times, no contact wear is involved, whereby the effects of various settings may be altered.

From the description above it will be noted that the operation of my device is dependent upon the thermal characteristics of the bimetal 14 and the initial stress imposed on it by adjustment of contact 22. Once the size and composition of the bimetal 14 have been determined, and the device calibrated by adjustment of contact 22, the temperature which the bimetal 14 must attain to cause separation of the contacts 20 and 22, will remain constant, as the thermal characteristics of a given bimetallic element are a constant. The thermal characteristics of a given bimetal 14 will thus determine the cycling temperature of the bimetal 14, and this will be a constant or fixed temperature irrespective of whether the temperature is arrived at due to heat supplied from the heater coil 36, the vessel 8, or both. Actually, in operation, the cycling temperature of the bimetal 14 is achieved due to heat received from both the vessel 8 and from heater coil 36. The temperature of the vessel can thus be varied from a low temperature where most of the heat required to bring the bimetal 14 up to its cycling temperature is supplied by the heater 36, to a high temperature where most of the heat required to bring the bimetal 14 up to its cycling temperature is supplied from the cooling vessel 8. The temperature of the cooking vessel is thus controlled by the variable resistance 46, 48 to vary the temperature at which the vessel is maintained. For high temperatures of the vessel 8, a minimum amount of heat is required from heater 36, and this could obviously be reduced to zero for the highest temperature of the cooking vessel corresponding to the cycling temperature of the bimetal 14. In practice, the device is calibrated by adjustment of the contact 22 so that the bimetal will separate the contact 20 when it achieves a temperature corresponding to the highest desired temperature of the cooking vessel.

Still another advantage of a resistance control element is the fact that the position of the control handle, and particularly so in the case of a slide switch as described, directly indicates the heat setting of the device. Thus, no auxiliary heat setting means, such as a color indicator or calibrated dials, are required.

By proper selection of the components, the desired range of operating temperatures of vessel 8 can be achieved. An important factor in my design is the fact that the heater 36 and the variable resistance 46, 48 are electrical resistance units which have linear current-temperature characteristics so that the heat received from the vessel 8 and its temperature will also vary linearly with adjustment of the variable resistance 46, 48 because the operating temperature of the bimetal 14 is a constant. Further, once the bimetal 14 has been selected, the contact 22 is adjusted as indicated, to engage the contact 20 so that the desired contact pressure with relation to the specific bimetal 14 is obtained.

Further, although the control has been described with relation to an electrical resistance heating unit, the principles of my invention are equally adapted for use with other heat output units, such as a gas burner, by utilizing the movement of the bimetal 54 to control other types of well known control devices for use with other types of heating unit controls.

Having described preferred embodiments of my invention in accordance with the patent statutes, it is desired that the invention be not limited to the specific constructions shown, inasmuch as it is apparent that modifications thereof may be made without departing from the broad spirit and scope of my invention. Accordingly, it is desired that the invention be interpreted as broadly as possible, and that it be limited only as required by the prior art.

I claim as my invention:

1. A control device for controlling the temperature of a cooking vessel and its contents by controlling an electrical heating unit comprising, a high thermal conductivity portion for sensing the temperature of a vessel being heated by said heating unit and having a control portion which is movable with relation to said thermal portion in response to temperature changes in said thermal portion, means electrically connected to said control portion for controlling the energization of the heating unit in response to movement of said control portion, an auxiliary electrical heater supported in heat transmitting relation with respect to said control portion to also cause movement thereof, and a variable electrical resistance connected with said electrical heater to vary the magnitude of current through said heater whereby the movement of said control portion may be controlled, said control portion being movable, upon increase in temperature, in the direction of terminating energization of the heating unit.

2. A control device for controlling the temperature of a cooking vessel and its contents by controlling the heat output of a heating unit comprising, a high thermal conductivity portion for sensing the temperature of a vessel being heated by said heating unit and having a control portion which is movable with relation to said thermal portion in response to temperature changes in said thermal portion, means electrically connected to said control portion for controlling the heat output of the heating unit in response to movement of said control portion, an auxiliary electrical heater supported in heat transmitting relation with respect to said control portion to also cause movement thereof, and a variable electrical resistance connected with said electrical heater to vary the magnitude of the current through said heater whereby the time required for movement of said control portion may be varied.

3. A control device for controlling the temperature of a cooking vessel and its contents by controlling an electrical heating unit comprising, a sensor plate of a heat conducting material, an elongated bimetallic member mechanically secured at one of its ends to said sensor plate in good heat conducting relation thereto, a pair of normally engaged contacts one of which is mechanically secured to the other end of said bimetallic member and which is movable out of engagement with the other of said contacts upon heating of said bimetallic member, an electrical resistance heater supported in heat transmitting relation with respect to said bimetallic member to cause heating thereof, a variable electrical resistance connected with said heater to vary the magnitude of the current through said heater whereby the time required for separation of said contacts may be varied, and electrical circuit means electrically connected to said contacts for controlling the electrical energization of an electrical heating unit.

4. A control device for controlling the temperature of a cooking vessel and its contents by means of controlling an electrical resistance unit comprising, a sensor plate of a heat conducting material, a heat responsive means secured to said sensor plate in good heat conducting relation thereto and having at least a portion thereof movable in response to heating thereof, a pair of contacts one of which is mechanically connected to said portion of said heat responsive means to be movable into and out of engagement with the other in response to movement of said heat responsive means, an electrical resistance heater supported in heat transmitting relation with respect to said heat responsive means to cause movement thereof, a variable electrical resistance connected to said heater to vary the magnitude of current through said heater, whereby the time required for said one contact to move into and out of engagement with said other contact may be varied, and electrical circuit means electrically connected to said contacts for controlling the electrical energization of an electrical heating unit.

5. A control device for controlling the temperature of a cooking vessel and its contents by controlling an electrical heating unit comprising, a sensor plate of a heat conducting material, a bimetallic member secured to said sensor plate in good heat conducting relation thereto, a pair of contacts one of which is mechanically connected to said bimetallic member to be movable into and out of engagement with the other in response to movement of said bimetallic member, an electrical resistance heater supported in heat transmitting relation with respect to said bimetallic member to cause movement thereof, a variable electrical resistance electrically connected in parallel with said heater to vary the magnitude of current through said heater, whereby the time required for said one contact to move into and out of engagement with said other contact may be varied, and electrical circuit means electrically connected to said contacts for controlling the electrical energization of an electrical heating unit.

6. A control device for controlling the temperature of a cooking vessel and its contents by controlling an electrical resistance unit comprising, a sensor plate of a heat conducting material, a bimetallic member secured to said sensor plate in good heat conducting relation thereto, a pair of contacts one of which is mechanically connected to said bimetallic member to be movable into and out of engagement with the other in response to movement of said bimetallic member, an electrical resistance heater supported in heat transmitting relation with respect to said bimetallic member to cause movement thereof, a variable electrical resistance electrically connected in series with said heater to vary the magnitude of current through said heater, whereby the time required for said one contact to move into and out of engagement with said other contact may be varied, and electrical circuit means electrically connected to each of said contacts for controlling the electrical energization of an electrical heating unit.

7. A control device for controlling the temperature of a cooking vessel and its contents by controlling an electrical heating unit comprising, a sensor plate of a heat conducting material, a bimetallic member secured to said sensor plate in good heat conducting relation thereto, a pair of contacts one of which is mechanically connected to said bimetallic member to be movable into and out of engagement with the other in response to movement of said bimetallic member, an electrical resistance heater supported in heat transmitting relation with respect to said bimetallic member to cause movement thereof, a potentiometer, circuit means connecting said heater to said potentiometer to vary the magnitude of the current through said heater, whereby the time required for said one contact to move into and out of engagement with said other contact may be varied, and electrical circuit means electrically connected to said contacts for controlling the electrical energization of an electrical heater unit.

8. A control device for controlling the temperature of a cooking vessel and its contents by controlling an electrical resistance unit comprising, a sensor plate of a heat conducting material, a bimetallic member secured to said sensor plate in good heat conducting relation thereto, a pair of contacts one of which is mechanically connected to said bimetallic member to be movable into and out of engagement with the other in response to movement of said bimetallic member, an electrical resistance heater mounted on said bimetallic member in heat transmitting relation thereto to cause movement thereof, a variable electrical resistance connected with said heater to vary the magnitude of the current through said heater whereby the time required for separation of said contacts may be varied, electrical relay means electrically connected to said contacts so as to be energized when said contacts are closed, and said relay means having contact means for controlling the electrical energization of an electrical heating unit.

9. A control device for controlling the temperature of a cooking vessel and its contents by controlling an electrical heating unit comprising, a high thermal conductivity portion for sensing the temperature of a vessel being heated by said heating unit and having a control portion which is movable with relation to said thermal portion in response to temperature changes in said thermal portion, a time delay relay electrically connected to said control portion for controlling the energization of the heating unit in response to movement of said control portion, an auxiliary electrical heater supported in heat transmitting relation with respect to said control portion to also cause movement thereof, and a variable electrical resistance connected with said electrical heater to vary the magnitude of current through said heater whereby the movement of said control portion may be controlled.

10. Apparatus of the type described comprising, a heating unit, a control device for said unit mounted adjacent thereto and having a sensing portion of heat conducting material located to sense the temperature of a device being heated by said heating unit, thermally responsive means secured to said sensing portion in good heat conducting relation thereto to be responsive to changes in temperature of said sensing portion to move in opposite directions, separable contacts operated into and out of engagement by movement of said thermally responsive means in opposite directions for controlling operation of said heating unit, an electrical heater for said thermally responsive means, and manually operable means mounted at a remote location for selectively varying the degree of energization of said electrical heater to thus vary the temperature of said sensing portion at which movement of said sensing portion occurs.

11. Apparatus of the type described comprising, a heating unit, a control device for said unit mounted adjacent thereto and having a sensing portion of heat conducting material located to sense the temperature of a device being heated by said heating unit, thermally responsive means secured to said sensing portion in good heat conducting relation thereto to be responsive to changes in temperature of said sensing portion to move in opposite directions, separable contacts operated into and out of engagement by movement of said thermally responsive means in opposite directions, time delay relay means connected to said separable contacts so as to respond to operation of said contacts for controlling operation of said heating unit, an electrical heater for said thermally responsive means, and manually operable means mounted at a remote location for selectively varying the degree of energization of said electrical heater to thus vary the temperature of said sensing portion at which movement of said sensing portion occurs.

12. A control device for controlling the temperature of a cooking vessel and its contents by controlling an electrical heating unit comprising, a high thermal conductivity portion for sensing the temperature of a vessel being heated by said heating unit and having a control portion which is movable with relation to said thermal portion in response to temperature changes in said thermal portion, means electrically connected to said control portion for controlling the energization of the heating unit in response to movement of said control portion, an auxiliary electrical heater supported in heat transmitting relation with respect to said control portion to also cause movement thereof, and manually operable means connected with said electrical heater to vary the magnitude of current through said heater whereby the movement of said control portion may be controlled.

13. A control device for controlling the temperature of a vessel heated by a heating unit comprising, a sensor element of good heat conducting material for sensing vessel temperature, thermally responsive means secured to said sensor element in good heat conducting relation thereto and operable to move in opposite directions in response to heating and cooling of said sensor element, separable contacts one of which is moved into and out of engagement with the other in response to movement of said thermally responsive means, an electrical heater mounted in heat transmitting relation with said thermally responsive means, manually operable means for selectively varying the degree of energization of said electrical heater to thus vary the temperature of said sensor element at which movement of said thermally responsive means occurs, and electrical circuit means connected to said contacts for controlling operation of a heating unit.

14. A control device for controlling the temperature of a vessel heated by a heating unit comprising, a sensor element of good heat conducting material for sensing vessel temperature, thermally responsive means secured to said sensor element in good heat conducting relation thereto and operable to move in opposite directions in response to heating and cooling of said sensor element, separable contacts one of which is moved into and out of engagement with the other in response to movement of said thermally responsive means, an electrical heater mounted in heat transmitting relation with said thermally responsive means, manually operable means for selectively varying the degree of energization of said electrical heater to thus vary the temperature of said sensor element at which movement of said thermally responsive means occurs, the other of said contacts being adjustably mounted so that the temperature at which said thermally responsive means operates said contacts may be varied, and electrical circuit means connected to said contacts for controlling operation of a heating unit.

15. A control device for controlling the temperature of a cooking vessel and its contents by controlling an electrical heating unit comprising, a sensor plate of a heat conducting material, an elongated resilient bimetallic member mechanically secured at one of its ends to said sensor plate in good heat conducting relation thereto, a pair of normally engaged contacts one of which is mechanically secured to the other end of said bimetallic member and which is movable out of engagement with the other of said contacts upon heating of said bimetallic member, the other of said contacts being adjustably mounted to calibrate the temperature of said bimetallic member at which said contacts are operated, an electrical resistance heater supported in heat transmitting relation with respect to said bimetallic member to cause heating thereof, a variable electrical resistance connected with said heater to vary the magnitude of the current through said heater whereby the time required for separation of said contacts may be varied, and electrical circuit means electrically connected to said contacts for controlling the electrical energization of an electrical heating unit.

16. A control device for controlling the temperature of a cooking vessel and its contents by controlling the heat output of a heating unit comprising, a high thermal conductivity portion for sensing the temperature of a vessel being heated by said heating unit, thermostatic means having one portion secured in good heat transfer relation to said thermal portion for movement of a remote portion thereof in response to temperature changes of said thermal portion, means responsive to movement of said remote portion of said thermostatic means for controlling the heat output of the heating unit, an auxiliary electrical heater supported in heat transmitting relation with respect to a portion of said thermostatic means to also cause movement thereof, and a variable electrical resistance connected with said electrical heater to vary the magnitude of the current through said heater, whereby the time required for movement of said control portion may be varied.

17. A control device for controlling the temperature of a cooking vessel and its contents by controlling the heat output of a heating unit comprising, a high thermal conductivity portion for sensing the temperature of a vessel being heated by said heating unit and having a control portion which is movable with relation to said thermal portion in response to temperature changes in said thermal portion, means responsive to movement of said control portion for controlling the heat output of the heating unit, an auxiliary electrical heater supported in heat transmittnig relation with respect to said control portion to also cause movement thereof, and a variable electrical resistance connected with said electrical heater to vary the magnitude of the current through said heater whereby the time required for movement of said control portion may be varied.

18. A control device for controlling the temperature of a cooking vessel and its contents by controlling the heat output of a heating unit comprising, a high thermal conductivity portion for sensing the temperature of a vessel being heated by said heating unit, thermostatic means having one portion secured in good heat transfer relation to said thermal portion for movement of a remote portion thereof in response to temperature changes of said thermal portion, time delay relay means responsive to movement of said remote portion of said thermostatic means for controlling the heat output of the heating unit, an auxiliary electrical heater supported in heat transmitting relation with respect to a portion of said thermostatic means to also cause movement thereof, and a variable electrical resistance connected with said electrical heater to vary the magnitude of the current through said heater, whereby the time required for movement of said control portion may be varied.

19. A control system for an electrical heating unit comprising, input and output terminals adapted to be connected to a multi-voltage source of electrical energy and to an electrical heating unit, respectively, conductors electrically connecting the high voltage input terminals to said heating unit including relay means having contacts in at least one of said conductors, a control circuit electrically connected with the low voltage input terminals, said control circuit including an auxiliary electrical heater for one part of a thermally responsive means having contacts controlling energization of the operating means for said relay means from said control circuit, manually operable means in circuit with said auxiliary heater for selectively varying the degree of energization of said auxiliary heater, a sensor element for sensing the temperature of a vessel being heated by said heating unit, and a thermal connection between another part of said thermally responsive means and said sensor element.

20. A control system for an electrical heating unit comprising, input and output terminals adapted to be connected to a multi-voltage source of electrical energy and to an electrical heating unit, respectively, conductors electrically connecting the high voltage input terminals to said heating unit including relay means having contacts in at least one of said conductors, a control circuit electrically connected with the low voltage input terminals, said control circuit including an auxiliary electrical heater for one part of a thermally responsive means having contacts controlling energization of the operating means for said relay means from said control circuit, manually operable means of variable impedance connected across said control circuit for selectively varying the degree of energization of said auxiliary heater, a sensor element for sensing the temperature of a vessel being heated by said heating unit, and a thermal connection between another part of said thermally responsive means and said sensor element.

21. A control system for an electrical heating unit comprising, input and output terminals adapted to be connected to a multi-voltage source of electrical energy and to an electrical heating unit, respectively, conductors electrically connecting the high voltage input terminals to said heating unit including relay means having contacts in at least one of said conductors, a control circuit electrically connected with the low voltage input terminals, said control circuit including an auxiliary electrical heater for one part of a thermally responsive means having contacts controlling energization of the operating means for said relay means from said control circuit, manually operable means of variable impedance connected in series with said auxiliary heater across said control circuit for selectively varying the degree of energization of said auxiliary heater, a sensor element for sensing the temperature of a vessel being heated by said heating unit, and a thermal connection between another part of said thermally responsive means and said sensor element.

22. A control system for an electrical heating unit comprising, input and output terminals adapted to be connected to a multi-voltage source of electrical energy and to an electrical heating unit, respectively, conductors electrically connecting the high voltage input terminals to said heating unit including relay means having contacts in at least one of said conductors, a control circuit electrically connected with the low voltage input terminals, said control circuit including an auxiliary electrical heater for one part of a thermally responsive means having contacts controlling energization of the operating means for said relay means from a second low voltage control circuit supplied from the low voltage input terminals, manually operable means in circuit with said auxiliary heater for selectively varying the degree of energization of said auxiliary heater, a sensor element for sensing the temperature of a vessel being heated by said heating unit, and a thermal connection between another part of said thermally responsive means and sensor element.

References Cited in the file of this patent

UNITED STATES PATENTS

| | | |
|---|---|---|
| 2,399,423 | Bletz | Apr. 30, 1946 |
| 2,427,945 | Clark | Sept. 22, 1947 |
| 2,524,506 | Akeley | Oct. 3, 1950 |
| 2,606,990 | Akeley | Aug. 12, 1952 |
| 2,678,379 | Fry | May 11, 1954 |
| 2,816,203 | Weeks | Dec. 10, 1957 |